US009702996B2

(12) United States Patent
Goggin et al.

(10) Patent No.: US 9,702,996 B2
(45) Date of Patent: Jul. 11, 2017

(54) INSTANTANEOUS ISOCHRON ATTRIBUTE-BASED GEOBODY IDENTIFICATION FOR RESERVOIR MODELING

(71) Applicants: Lisa Renee' Goggin, Sugar Land, TX (US); Francisco Correa Mora, Sugar Land, TX (US); Luz Angela Lozano Ramos, Houston, TX (US)

(72) Inventors: Lisa Renee' Goggin, Sugar Land, TX (US); Francisco Correa Mora, Sugar Land, TX (US); Luz Angela Lozano Ramos, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 424 days.

(21) Appl. No.: 14/311,987

(22) Filed: Jun. 23, 2014

(65) Prior Publication Data
US 2015/0369935 A1    Dec. 24, 2015

(51) Int. Cl.
*G01V 1/30* (2006.01)
*G01V 1/28* (2006.01)
(Continued)

(52) U.S. Cl.
CPC .............. *G01V 1/282* (2013.01); *G01V 1/302* (2013.01); *G01V 1/307* (2013.01); *G01V 1/345* (2013.01);
(Continued)

(58) Field of Classification Search
CPC .................................................. G01V 1/302
(Continued)

(56) References Cited

U.S. PATENT DOCUMENTS

| 5,796,678 A | 8/1998 | Pisetski |
| 2006/0041409 A1 | 2/2006 | Strebelle et al. |
| 2016/0139282 A1* | 5/2016 | Dimitrov ............... G01V 1/302 703/2 |

FOREIGN PATENT DOCUMENTS

CN          1797036 A        7/2006

OTHER PUBLICATIONS

Lomask, J., et al; "New Tools for Seismic Stratigraphic Interpretation: Stratal Convergence and Instantaneous Isochron Attribute Cubes Derived from Volumetric Flattening of Experimental Strata"; AAPG Bulletin, vol. 93, No. 4, Apr. 2009, pp. 453-459.

(Continued)

*Primary Examiner* — Bryan Bui
(74) *Attorney, Agent, or Firm* — Albert K. Shung; Marie L. Clapp

(57) ABSTRACT

Automated systems and methods that provide robust identification of regions of interest for reservoir modeling are disclosed herein. One embodiment includes: obtaining a seismic image of a subsurface region; performing full-volume horizon picking and deriving an instantaneous isochron attribute (IIA) value for each point in the seismic image; identifying one or more geobodies within the seismic image based at least in part on the IIA values; and representing the one or more geobodies in a geocellular model. The identifying of geobodies may include: applying IIA value filtering to isolate intervals of rapid or slow deposition in the seismic image; determining a reservoir-non-reservoir indicator attribute value for each point in the seismic image; applying reservoir-non-reservoir indicator value filtering to isolate subintervals of presumed reservoirs or non-reservoirs in said isolated intervals; determining a pay indicator attribute value for each point in the seismic image; and applying (Continued)

pay indicator value filtering to isolate presumed pay zones in said isolated subintervals.

12 Claims, 6 Drawing Sheets

(51) Int. Cl.
  *G01V 1/34* (2006.01)
  *G01V 99/00* (2009.01)
(52) U.S. Cl.
  CPC ........ *G01V 99/00* (2013.01); *G01V 2210/643* (2013.01)
(58) Field of Classification Search
  USPC .................................................... 702/64, 14
  See application file for complete search history.

(56) References Cited

OTHER PUBLICATIONS

Rickett, J.E., et al.; "Instantaneous Isochrons, Volume-Flattening and a High Resolution View of Sedimentation Rate"; 70$^{th}$ EAGE Conference & Exhibit, Rome, Italy, Jun. 2008, pp. 1-6.
International Search Report, issued on Jul. 7, 2015, during the prosecution of International Application No. PCT/US2015/017667.
Written Opinion of the International Searching Authority, issued on Jul. 7, 2015, during the prosecution of International Application No. PCT/US2015/017667.
Paul de Groot, Global Seismic Interpretation Techniques Are Coming of Age, Aug. 11-14, 2013, Melbourne, AU, 23$^{rd}$ International Geophysical Conference and Exhibition.
Jesse Lomask, Volumetric flattening: an interpretation tool, Jul. 2007, The Leading Edge, 3DGeo Inc., Santa Clara, CA.
PCT International Preliminary Report on Patentability, International Application No. PCT/US2015/017667, dated Jan. 5, 2017, 7 pages.

* cited by examiner

INSTANTANEOUS ISOCHRON ATTRIBUTE-BASED GEOBODY IDENTIFICATION FOR RESERVOIR MODELING

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to reservoir modeling.

BACKGROUND

Reservoir simulation requires a three dimensional model of the reservoir. The model employs a grid or some other technique to divide the reservoir region into cells, each cell having an associated value for each of one or more geophysical properties. Typical properties include porosity, permeability, and water saturation. Millions of cells may be needed to represent the spatial distribution of properties adequately enough for a flow simulator to predict oil and gas recovery, production profiles and to assist in planning the number of wells. As the number of cells increases, the geocellular model becomes more burdensome to dynamically simulate.

One approach to limiting the size of the model is to model only the cells in the regions of interest. However, to be able to cut away or ignore the portions of the subsurface that do not affect the reservoir behavior, the analyst must be able to identify those regions of particular interest. Generally, such identification is accomplished via manipulation of a three dimensional seismic image that is controlled by the analyst. For example, the analyst may ask that certain attributes of the seismic waves be calculated and displayed, e.g., amplitude, phase, correlation, and associated derived properties. The analyst may assign color and opacity values to different ranges of attribute values to highlight certain portions of the data. The analyst may select different viewpoints and "slice" orientations through the data volume. The analyst may "flatten" the image along a selected reference horizon, or flatten all of the horizons. In short, the analyst has an arsenal of tools at his disposal for perusing the seismic image to identify particular regions of interest. However, the time required for the analyst to identify regions of interest is often quite limited, and in practice it is common for decisions to be made with analysis completed on only a small fraction of the seismic image data.

BRIEF SUMMARY

Accordingly, there are disclosed herein automated systems and methods that provide robust identification of regions of interest for reservoir modeling. One method embodiment includes: obtaining a seismic image of a subsurface region; performing full-volume horizon picking and deriving an instantaneous isochron attribute (IIA) value for each point in the seismic image; identifying one or more geobodies within the seismic image based at least in part on IIA value; and representing the one or more geobodies in a geocellular model. The method may further include: deriving a reservoir production plan from the geocellular model; and displaying one or more parameters of the reservoir production plan. In at least some cases, the identifying of geobodies includes applying IIA value filtering to isolate intervals of rapid or slow deposition in the seismic image; determining a reservoir-non-reservoir indicator attribute value for each point in the seismic image; applying reservoir-non-reservoir indicator value filtering to isolate subintervals of presumed reservoirs or non-reservoirs in said isolated intervals; determining a pay indicator attribute value for each point in the seismic image; and applying pay indicator value filtering to isolate presumed pay zones in said isolated subintervals.

One system embodiment includes: a memory having geomodeling software; and one or more processors coupled to the memory to execute the software. The geomodeling software causes the one or more processors to: obtain a seismic image showing a seismic attribute value as a function of position in of a subsurface region; perform full-volume horizon picking in the seismic image and derive from the seismic image an instantaneous isochron attribute (IIA) value as a function of position; identify one or more geobodies within the seismic image based at least in part on the IIA values; and represent the one or more geobodies in a geocellular model.

Figure 1:
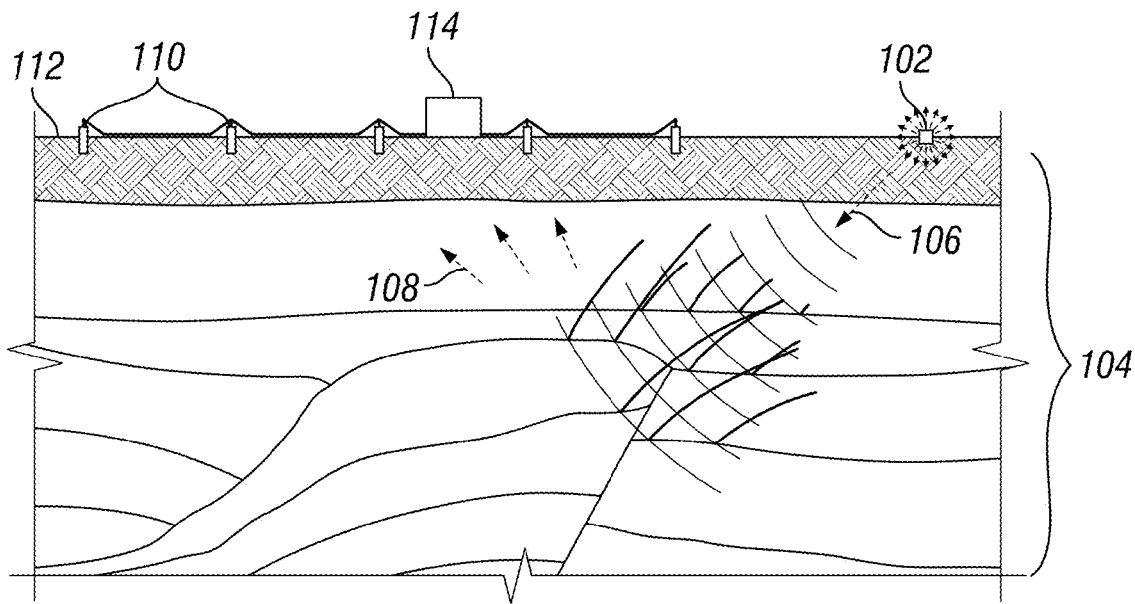
FIG. 1 is a schematic depiction of a seismic survey.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Seismic surveys can be performed on land or in water. As indicated in FIG. 1, an energy source 102 near the region of interest 104 generates waves 106 that propagate into the region of interest and reflect from internal features such as bed boundaries. Eventually the reflected waves 108 reach an array of receivers 110 on the surface 112. A recording system 114 captures the received signals for storage and processing.

The process is repeated with many different source positions and optionally with different receiver positions. Although various methods exist for converting the received wave signals into an image of the subsurface structure, the most popular such techniques employ finite difference wave field modeling, a process that propagates waves forward or backward in time using discrete time steps and fast approximations of wave function derivatives.

Figure 2:
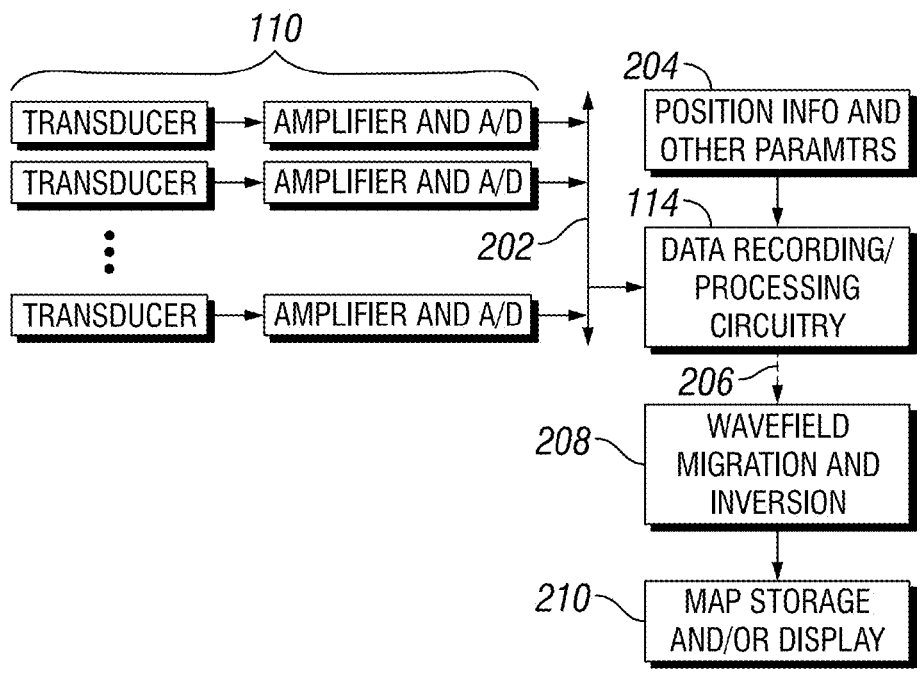
FIG. 2 is a block diagram of a seismic survey system having a finite difference wavefield simulator.
Figure 3:
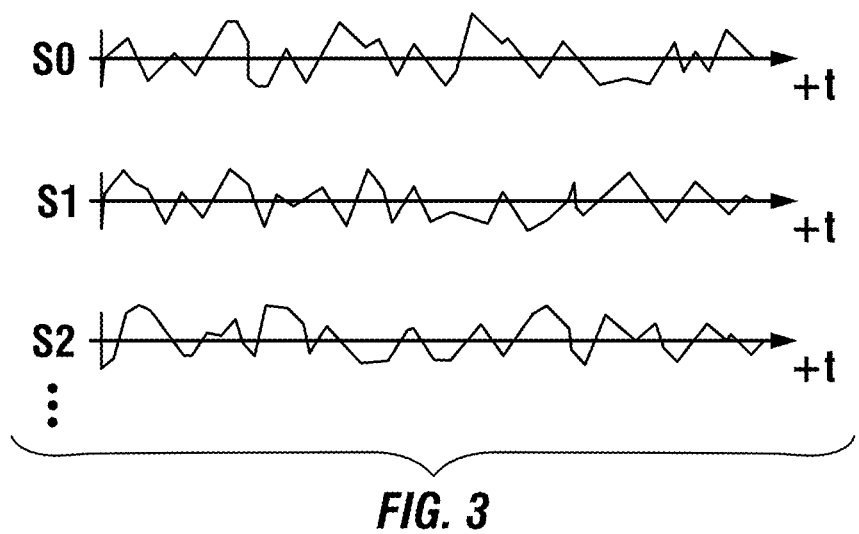
FIG. 3 shows illustrative digitized receive signal traces.

Accordingly, the seismic imaging process may be embodied in a system and context such as that shown in FIG. 2. An array of seismic receivers 110 convert seismic waves to electrical signals that are amplified and digitized. (Illustrative signal waveforms are shown in FIG. 3.) A recording system 114 collects the digitized signals via a bus 202 or other communications pathway and stores the digitized signals on an information storage medium for later processing. Typically, each digitized signal is associated with parameters 204 such as a receiver location and a shot location and such other information as the system designer deems worthwhile. Recording system 114 may perform some initial processing to filter and/or compress the data, and in at least some cases, to perform quality control.

The recording system 114 provides the seismic survey data via the Internet or some other communications mechanism 206 to a data processing center 208 having sufficient computational resources for the imaging process. The data processing center includes one or more computers that may use finite difference wave field modeling to perform migration and thereby convert the recorded seismic signals into a three dimensional map or "image" of the subsurface structure which can be displayed on a monitor 210 and stored in persistent storage for later use.

Figure 4:
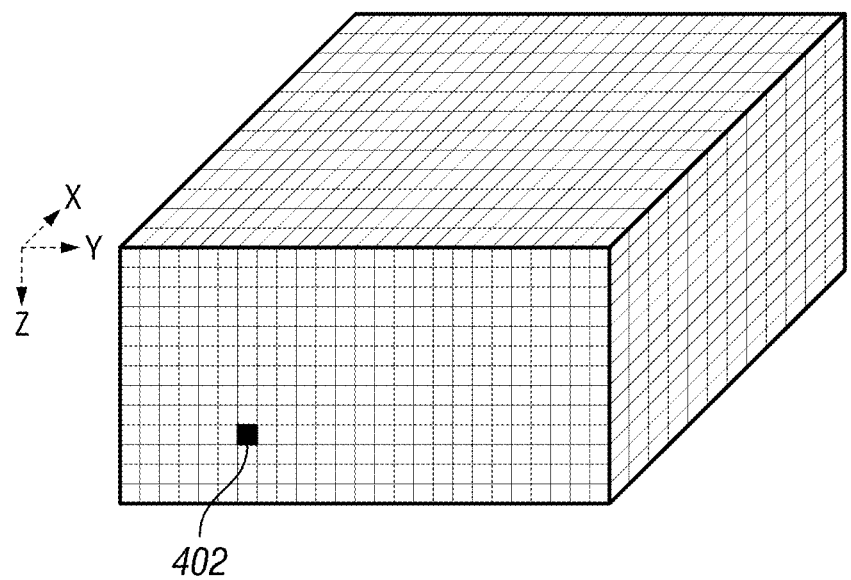
FIG. 4 shows a data space representing a subsurface region of interest.

To simulate the wave field and construct the image, the data processing center models the region of interest as a two-dimensional or three-dimensional space divided into a grid of cells 402. FIG. 4 shows an example of a 3D space. The properties of all of the points within an element are assumed to be uniform and thus can be represented as a single point. Typically, the imaging process yields for each cell some measure of reflectivity or coherence.

Figure 5:
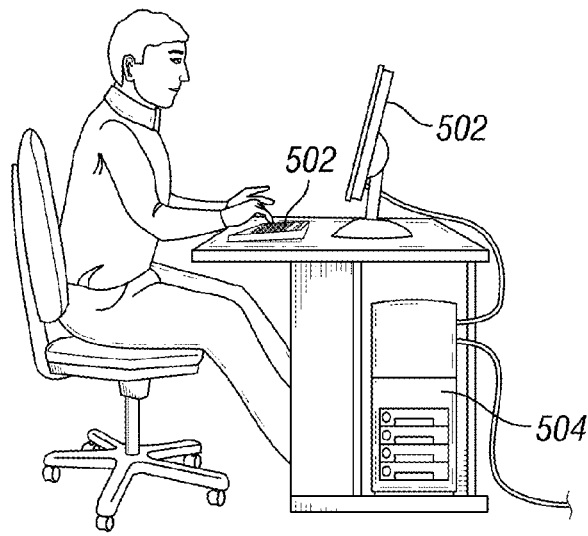
FIG. 5 shows a geomodeler employing an illustrative modeling system.

A shown in FIG. 5, a geo-modeler employs a user interface 502 of a workstation 504 to view and analyze the seismic image. The workstation 504 is part of the hardware platform of a subsurface modeling system such as that shown in FIG. 6. The illustrative hardware platform couples the workstation 504 to one or more multi-processor computers 606 via a local area network (LAN) 604. The one or more multi-processor computers 606 are in turn coupled via a storage area network (SAN) 608 to one or more shared storage units 610. Using the personal workstation 504, the geo-modeler is able to load seismic image data into the system, to configure and monitor the processing of the seismic image data and to retrieve the results from the system, optionally in the form of volumetric images.

Personal workstation 504 may take the form of a desktop computer with a display that shows graphical representations of the input and result data, and with a keyboard that enables the user to move files and execute processing software. LAN 604 provides high-speed communication between multi-processor computers 606 and with personal workstation 504. The LAN 604 may take the form of an Ethernet network.

Multi-processor computer(s) 606 provide parallel processing capability to enable suitably prompt processing of the input data to derive the results data. Each computer 606 includes multiple processors 612, distributed memory 614, an internal bus 616, a SAN interface 618, and a LAN interface 620. Each processor 612 operates on allocated tasks to solve a portion of the overall problem and contribute to at least a portion of the overall results. Associated with each processor 612 is a distributed memory module 614 that stores application software and a working data set for the processor's use. Internal bus 616 provides inter-processor communication and communication to the SAN or LAN networks via the corresponding interfaces 618, 620. Communication between processors in different computers 606 can be provided by LAN 604.

SAN 608 provides high-speed access to shared storage devices 610. The SAN 608 may take the form of, e.g., a Fibrechannel or Infiniband network. Shared storage units 610 may be large, stand-alone information storage units that employ magnetic disk media for nonvolatile data storage. To improve data access speed and reliability, the shared storage units 610 may be configured as a redundant disk array ("RAID").

It is the software that configures the hardware platform to operate as a subsurface geomodeling system. One or more proprietary or commercially available software packages may be installed on the hardware platform to provide the desired functionality. User-authored scripts, workflows, or other programming mechanisms may be employed to customize the operation of the software and automate certain operations such as those outlined below for geobody extraction. Examples of commercially available software that supports the use of such user programming include Paradigm's GOCAD software, which supports the use of TCL ("Tool Command Language") or CLI ("Command Language Interface), and Schlumberger's Petrel software, which includes a Process Manager for authoring workflows. Both software packages support the use of plug-ins that can be authored in traditional programming languages such as C++.

Figure 6:
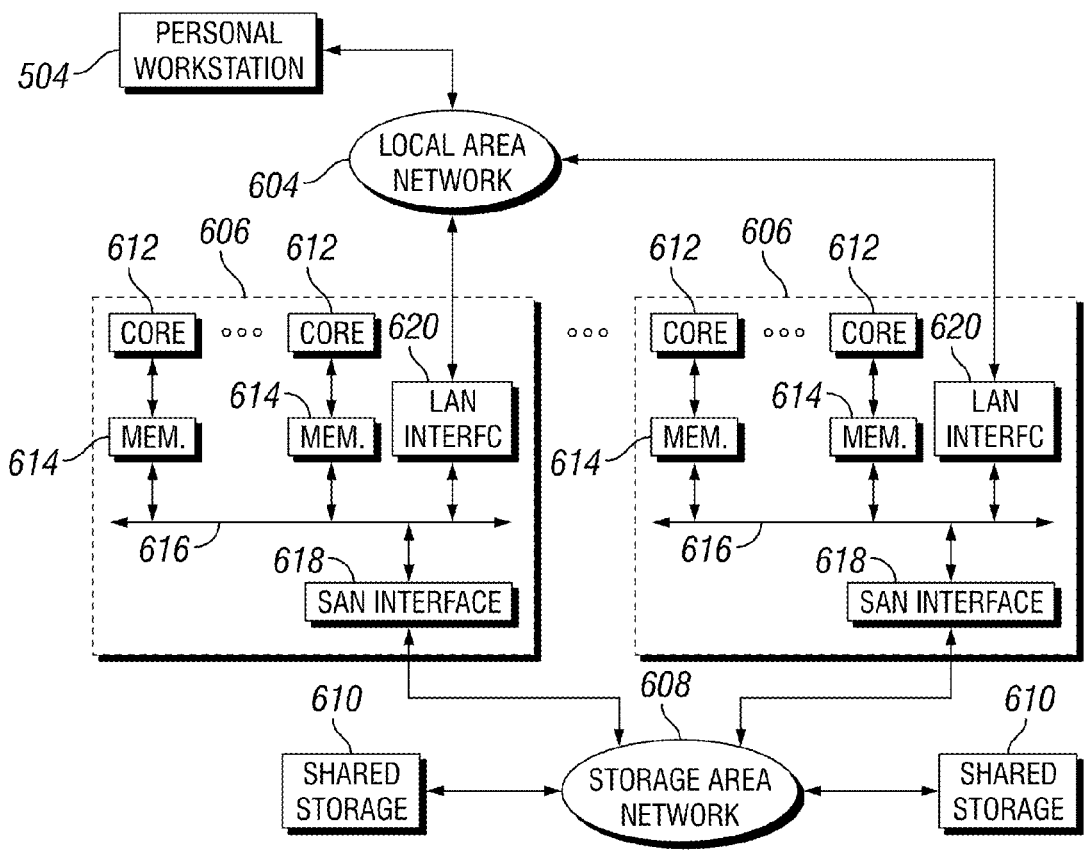
FIG. 6 is a block diagram of an illustrative hardware platform suitable for geophysical modeling.
Figure 7:
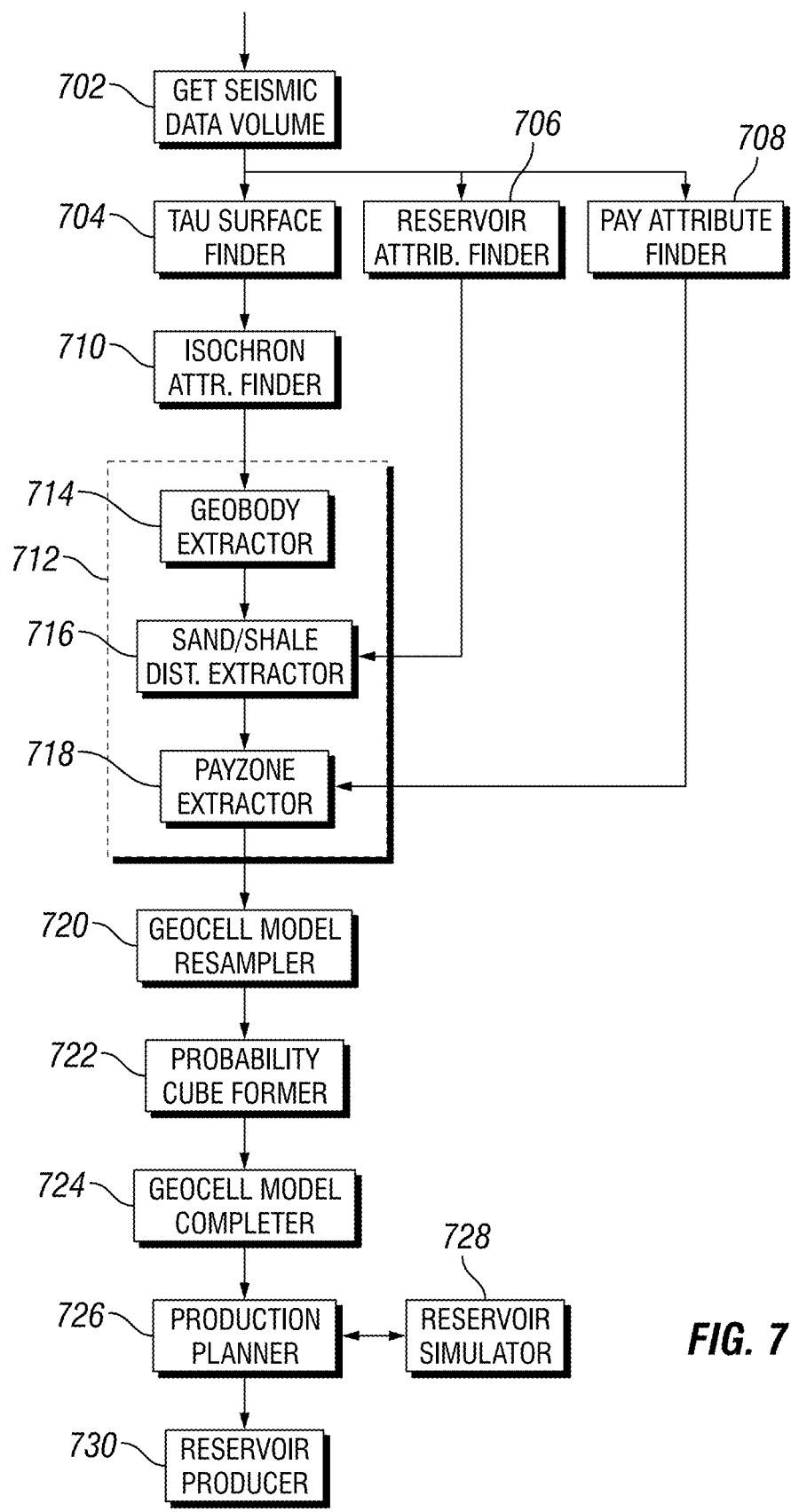
FIG. 7 is a flow diagram of an illustrative subsurface modeling method.
Figure 8:
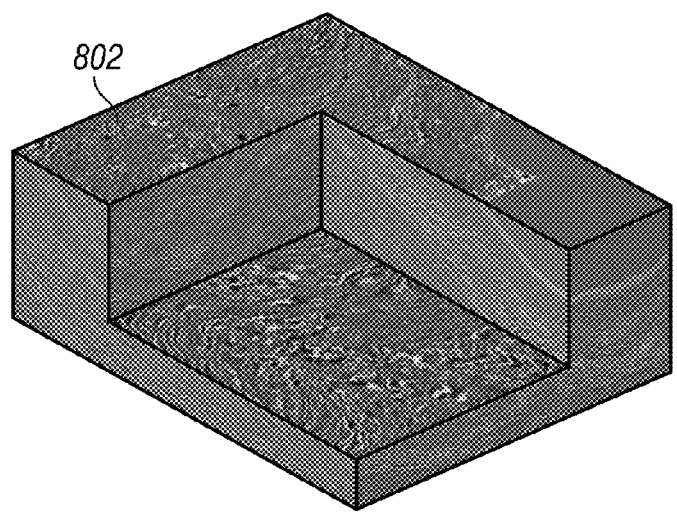
FIG. 8 is an illustrative 3D seismic image.

FIG. 7 is a flow diagram of an illustrative subsurface modeling method that may be embodied as a user-authored script, workflow, or program and implemented by the system of FIG. 6. The various blocks may represent individual software modules, though in some embodiments multiple blocks may be implemented as a single module. In block 702, the system establishes access to the seismic image. (An illustrative seismic image visualization 802 appears in FIG. 8. A cutaway portion reveals vertical and horizontal slices of the image that will be used for illustrative purposes below.) The seismic image is loaded and processed in blocks 704, 706, and 708, to find tau surfaces, calculate a reservoir-nonreservoir attribute, and derive a pay attribute.

Figure 9:
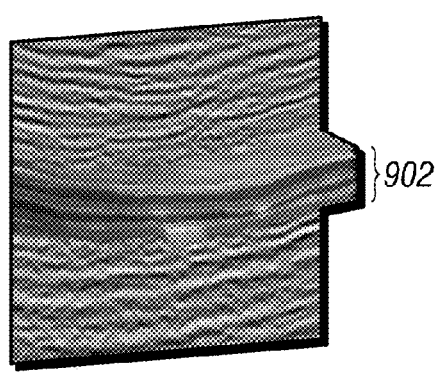
FIG. 9 shows an illustrative set of tau horizons picked from a seismic image.

In block 704, the system applies a global seismic interpretation technique such as Age Volume, PaleoScan, Volumetric Flattening, or HorizonCube to perform full-volume horizon picking in the seismic image. Such techniques are presented in the literature, including J. Lomask and A. Guitton, "Volumetric Flattening: an interpretation tool", The Leading Edge 26, 888-897, 2007; J. Lomask et al., "New tools for seismic stratigraphic interpretation: Stratal convergence and instantaneous isochron attribute cubes derived from volumetric flattening of experimental strata", AAPG Bulletin 93:4, 453-459, April 2009; and Paul de Groot, "Global Seismic Interpretation Techniques are Coming of Age", $23^{rd}$ Int. Geophys. Conf., 11-14 Aug. 2013. The identified horizons generally correspond to deposition surfaces sharing a given geologic time, i.e., tau surfaces. FIG. 9 shows an illustrative set of identified tau surfaces 902 with a vertical slice of the seismic image for reference.

Figure 10A:
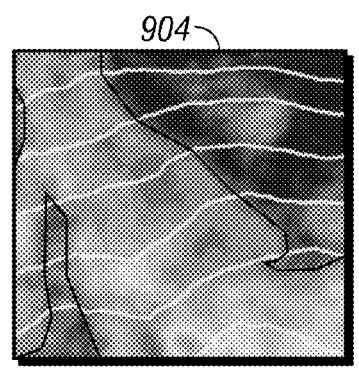
FIGS. 10a-10d show attribute-based geobody identification.
Figure 10B:
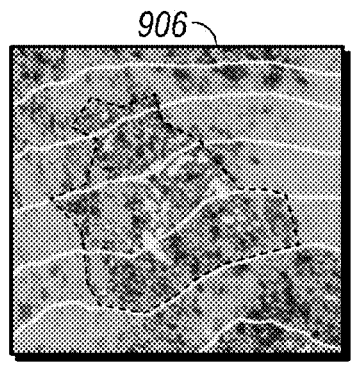

In block 706, the system processes the seismic image data to determine for each point in the image a reservoir attribute value. (FIG. 10b shows a horizontal slice of the reservoir attribute values 906 associated with a portion of the seismic image. Different colors represent the different attribute values. A dark outline is shown around the attribute values above a given threshold as discussed later below.) The reservoir attribute values fall within a range that, at one end, indicates that the associated part of the seismic image represents a facies that is reservoir-like (i.e., has relatively high porosity and poor consolidation) and at the other end, indicates that the represented facies is non-reservoir-like (i.e., relatively low porosity and good consolidation). As set out in the literature, a variety of methods exist for calculating this attribute, with the most suitable method varying from region to region. See, e.g., S. Chopra and K. J. Marfurt, *Seismic attributes for prospect identification and reservoir characterization*, Soc. Exploration Geophysicists: Tulsa, 257-556, 2007.

Figure 10C:
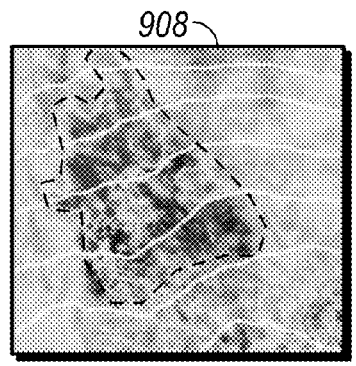

In block 708, the system processes the seismic image data to determine for each point in the image a pay attribute value. (FIG. 10*c* shows a horizontal slice of the pay attribute values 908 associated with a portion of the seismic image. Different colors represent different values for the attribute. A dark outline is shown around the attribute values above a given threshold as discussed later below.) The pay attribute represents some measure of the density or concentration of producible hydrocarbon, with higher values being generally desirable. As with the reservoir attribute, a variety of methods exist for calculating this attribute, with the most suitable method varying from region to region. See the Chopra and Marfurt book referenced above.

In block 710, the system employs the tau horizons to derive an instantaneous isochron attribute (IIA) value for each point in the image. The IIA attribute is a (moving average) measure of the distance between horizons, with greater thicknesses corresponding to zones of faster deposition and lesser values corresponding to zones of slower deposition. The calculation of this attribute is also set forth in the literature. (FIG. 10*a* shows a horizontal slice of the IIA attribute values associated with a portion of the seismic image. Different colors represent different values for the attribute. A dark outline is shown around the attribute values above a given threshold as discussed later below.)

The system then combines the various attributes to perform a geobody identification process as represented by block 712. In the illustrated embodiment, the geobody identification process is a sequence of three operations represented by blocks 714-718, but as will be clear from the following description, some of the operations may be combined or omitted. In some variations, additional operations may be included.

In block 714, the system identifies geobodies based on IIA attribute. Geobodies are contiguous image pixels (model cells) having attribute values within a selected range. In block 714, the system determines (and optionally displays) those pixels having IIA values above a threshold. (In FIG. 10*a*, this identification is shown as a black outline around the geobody.) The threshold can be initially set based on the range of attribute values, e.g., setting the threshold to eliminate all values below the $90^{th}$ percentile, and thereafter adjusted automatically or manually to conform the shape of the geobodies to patterns expected for sedimentary depositions.

In block 716, the geobodies identified in block 714 are refined based on the reservoir attribute. Those model cells having reservoir attribute values above a threshold (e.g., the ones outlined in FIG. 10*b*) are retained; the rest are excluded from the identified geobodies. The threshold may be initially set based on the reservoir attribute calculation method, and thereafter adjusted automatically or manually to satisfy objective criteria for continuity and overlap.

Figure 10D:
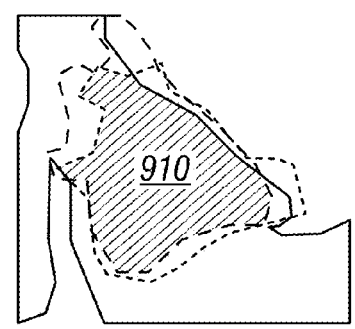
Figure 11:
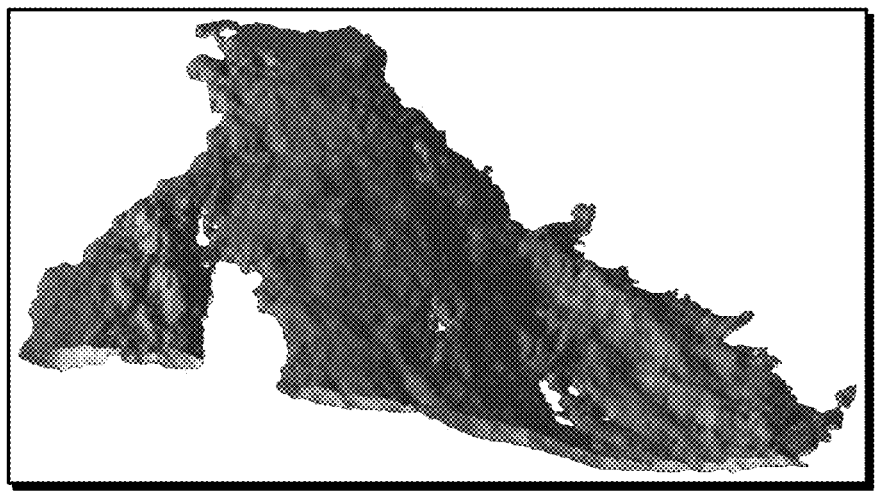
FIG. 11 shows an illustrative extracted 3D geobody.

In block 718, the geobodies identified in block 716 are further refined based on the pay attribute. Those model cells having pay attribute values above a threshold (e.g., the ones outlined in FIG. 10*c*) are retained; the rest are excluded from the identified geobodies. The pay threshold may be initially set based on the pay attribute calculation method, and thereafter adjusted automatically or manually to achieve a volume within some predetermined target range. As suggested by the cross-hatching 910 in FIG. 10*d*, the geobodies identified by block 712 correspond to the intersection of the outlined geobodies derived separated from the IIA, reservoir, and pay attributes. FIG. 11 is a perspective view of an illustrative three dimensional geobody.

In block 720, the system constructs a geocellular model to represent the identified geobodies in a form suitable for reservoir simulation. The system resamples the seismic image information to match the simulation-suitable resolution of the geocellular model in a statistically representative fashion. Typically, the geocellular model's spatial resolution is much coarser than that of the seismic image. Where sufficient information is available (e.g., formation property logs from exploratory or offset wells, simulation results from process-based modeling, stratigraphically extrapolated information from outcroppings, and other diverse sources employed by geologists), the seismic image properties are mapped to the relevant geophysical properties (e.g., porosity, permeability, and saturation). There may remain "null values" in the geocellular model where insufficient information is available to provide an adequate determination of geophysical properties.

In block 722, the system forms a probability cube, applying the principles set forth in the literature including S. B. Strebelle et al., "Method for making a reservoir facies model utilizing a training image and a geologically interpreted facies probability cube", US Pat. App. Pub. 2006/0041409 A1. For each cell in the geocellular model, the probability cube assigns a probability for each candidate facies in a set, the probability being the likelihood that the given cell consists of that facies. The probabilities can be assigned automatically based on the seismic image data and other available information, optionally using neural networks, expert systems, or some other implementation of a system that can perform pattern recognition and extrapolation. The probability cube may alternatively be constructed or modified manually.

Figure 12:
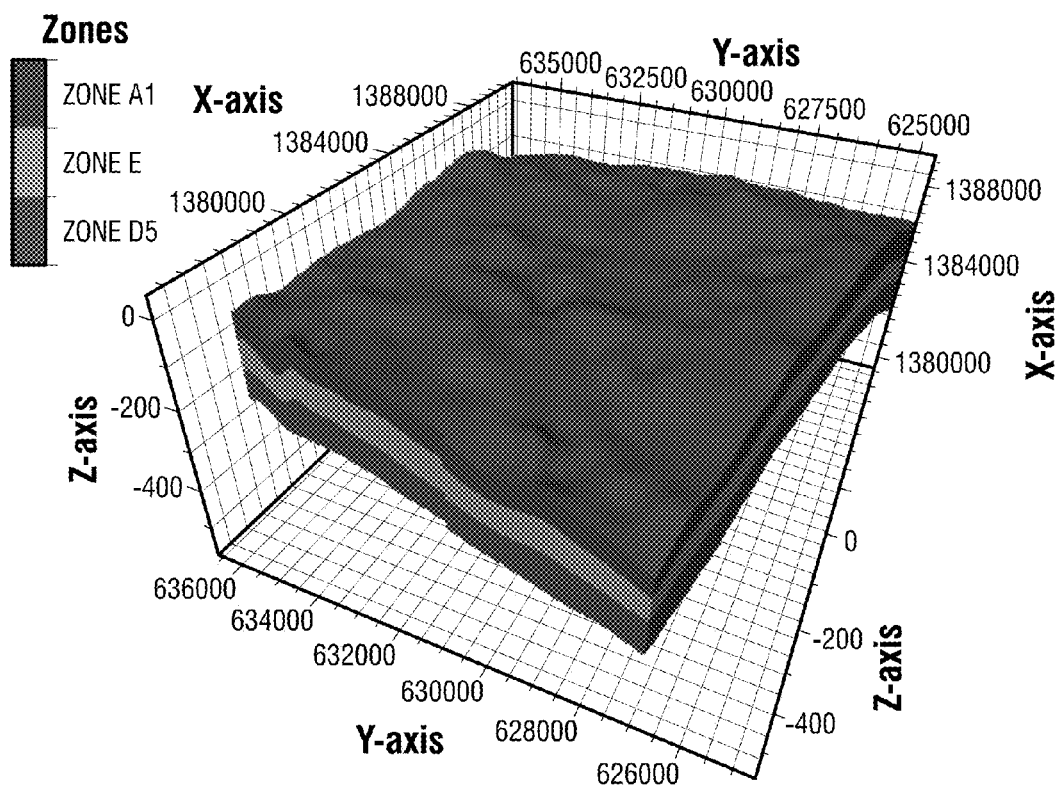
FIG. 12 shows an illustrative geocellular model.

In block 724, the system employs the probability cube, optionally in combination with one or more training images or templates (see Strebelle), to fill in the null values and complete the geocellular model with a statistically representative distribution of relevant geophysical properties. An illustrative completed geocellular model is shown in FIG. 12.

In block 726, the system generates one or more production strategies for the geocellular model, evaluating each one using a reservoir flow simulator in block 728. The production strategies may include values for such parameters as wellbore trajectories, well completion zones, and injection/production rate limits. The generation and evaluation of strategies may be performed adaptively or pursuant to any desired optimization technique for nonlinear problems. Once a satisfactory production strategy has been found, the system communicates the relevant parameters to the geomodeler for possible evaluation and adoption by a reservoir production team.

It is not strictly required for the blocks in the foregoing method to be performed in the given order. In at least some implementations, the blocks may be parallelized to enable concurrent performance of multiple operations on different parts of the seismic image. Moreover, though a lower threshold was used for filtering the attribute values, some implementations may employ an upper threshold (e.g., when searching for unconventional plays) or a range (e.g., when excluding facies that are neither reservoir nor unconventional reservoir). Other attributes may alternatively or additionally be employed for automated geobody identification. Though the foregoing methods can be automated, they may nevertheless be manually supervised, e.g., with a geomodeler reviewing the results of each block and repeating that block with new parameters if the results are not satisfactory.

Numerous other variations and modifications will become apparent to those skilled in the art once the above disclosure is fully appreciated. It is intended that the following claims be interpreted to embrace all such variations and modifications.

What is claimed is:

1. A method of modeling a subsurface region, the method comprising:
   obtaining a seismic image of a seismic attribute value as a function of position in a subsurface region;
   performing full-volume horizon picking in the seismic image and deriving from the seismic image an instantaneous isochron attribute (IIA) value as a function of position;
   identifying one or more geobodies within the seismic image based at least in part on the IIA values by applying IIA value filtering to isolate intervals of rapid or slow deposition in the seismic image; determining a reservoir-non-reservoir indicator attribute value as a function of position based on the seismic image; applying reservoir-non-reservoir indicator value filtering to isolate subintervals of presumed reservoirs or non-reservoirs in said isolated intervals, wherein the presumed reservoirs have relatively high porosity and poor consolidation and the presumed non-reservoirs have relatively low porosity and good consolidation; determining a pay indicator attribute value as a function of position based on the seismic image; and applying pay indicator value filtering to isolate presumed pay zones in said isolated subintervals; and
   representing the one or more geobodies in a geocellular model.

2. The method of claim 1, further comprising displaying the geocellular model representing the one or more geobodies.

3. The method of claim 1, further comprising:
   deriving a probability cube from the seismic image, based at least in part on seismic attribute values for the one or more geobodies; and
   using the probability cube to complete the geocellular model.

4. The method of claim 1, further comprising:
   deriving a reservoir production plan from the geocellular model; and
   displaying one or more parameters of the reservoir production plan.

5. The method of claim 4, wherein said deriving a reservoir production plan includes obtaining multiple production plan candidates and simulating a reservoir performance for each of the multiple production plan candidates.

6. The method of claim 1, wherein said representing includes:
   matching available well data to the seismic image;
   mapping attributes of the seismic data to reservoir properties including at least porosity, permeability, and saturation; and
   resampling to a spatial resolution suitable for reservoir performance simulation.

7. A system for modeling a subsurface region, the system comprising:
   a memory having geomodeling software; and
   one or more processors coupled to the memory to execute the software, the software causing the one or more processors to:
   obtain a seismic image showing a seismic attribute value as a function of position in of a subsurface region;
   perform full-volume horizon picking in the seismic image and derive from the seismic image an instantaneous isochron attribute (IIA) value as a function of position;
   identify one or more geobodies within the seismic image based at least in part on the IIA values by applying IIA value filtering to isolate intervals of rapid or slow deposition in the seismic image; determining a reservoir-non-reservoir indicator attribute value as a function of position based on the seismic image; applying reservoir-non-reservoir indicator value filtering to isolate subintervals of presumed reservoirs or non-reservoirs in said isolated intervals, wherein the presumed reservoirs have relatively high porosity and poor consolidation and the presumed non-reservoirs have relatively low porosity and good consolidation; determining a pay indicator attribute value as a function of position based on the seismic image; and applying pay indicator value filtering to isolate presumed pay zones in said isolated subintervals; and
   represent the one or more geobodies in a geocellular model.

8. The system of claim 7, wherein the software further causes the one or more processors to display the geocellular model representing the one or more geobodies.

9. The system of claim 7, wherein the software further causes the one or more processors to:
   derive a probability cube from the seismic image, based at least in part on seismic attribute values for the one or more geobodies; and
   use the probability cube to complete the geocellular model.

10. The system of claim 7, wherein the software further causes the one or more processors to:
    derive a reservoir production plan from the geocellular model; and
    display one or more parameters of the reservoir production plan.

11. The system of claim 10, wherein as part of said deriving a reservoir production plan, the software causes the one or more processors to obtain multiple production plan candidates and simulate a reservoir performance for each of the multiple production plan candidates.

12. The system of claim 7, wherein as part of said representing, the software causes the one or more processors to:
    match available well data to the seismic image;
    map attributes of the seismic data to reservoir properties including at least porosity, permeability, and saturation; and
    resample to a spatial resolution suitable for reservoir performance simulation.

* * * * *